(12) United States Patent
Hasse

(10) Patent No.: US 10,958,472 B2
(45) Date of Patent: Mar. 23, 2021

(54) DIRECT ACCESS TO BUS SIGNALS IN A MOTOR VEHICLE

(71) Applicant: AUDI AG, Ingolstadt (DE)

(72) Inventor: Andre Hasse, Gachenbach (DE)

(73) Assignee: Audi AG, Ingolstadt (DE)

( * ) Notice: Subject to any disclaimer, the term of this patent is extended or adjusted under 35 U.S.C. 154(b) by 233 days.

(21) Appl. No.: 16/316,854

(22) PCT Filed: Jun. 23, 2017

(86) PCT No.: PCT/EP2017/065552
§ 371 (c)(1),
(2) Date: Jan. 10, 2019

(87) PCT Pub. No.: WO2018/010938
PCT Pub. Date: Jan. 18, 2018

(65) Prior Publication Data
US 2020/0389339 A1    Dec. 10, 2020

(30) Foreign Application Priority Data
Jul. 13, 2016   (DE) .......................... 102016008957.1

(51) Int. Cl.
*H04L 12/40* (2006.01)
*H04L 29/06* (2006.01)
(Continued)

(52) U.S. Cl.
CPC ........ *H04L 12/40097* (2013.01); *H04L 12/66* (2013.01); *H04L 69/16* (2013.01);
(Continued)

(58) Field of Classification Search
CPC ..................... H04L 12/66; H04L 69/16; H04L 2012/40215; H04L 2012/40241; H04L 2012/40273; H04W 92/02
See application file for complete search history.

(56) References Cited

U.S. PATENT DOCUMENTS 6,526,460 B1 *   2/2003   Dauner ................ G01C 21/26
                                              701/48
7,599,377 B2 *  10/2009   Jordan ................ H04L 12/4135
                                              370/400
(Continued)

FOREIGN PATENT DOCUMENTS

CN        101046689 A      10/2007
CN        101584154 A      11/2009
(Continued)

OTHER PUBLICATIONS

International Search Report and Written Opinion of the International Searching Authority directed to related International Patent Application No. PCT/EP2017/065552, dated Aug. 8, 2017, with attached English-language translation; 29 pages.
(Continued)

*Primary Examiner* — Jenee Holland
(74) *Attorney, Agent, or Firm* — Sterne, Kessler, Goldstein & Fox P.L.L.C.

(57) ABSTRACT

The disclosure relates to a control system for at least one motor vehicle, including a first control unit having a data interface for coupling the first control unit to a vehicle data bus, as well as having a first network interface for coupling the first control unit to a second control unit via an internet-protocol-based network. The control system also includes the second control unit having a second network interface for coupling the second control unit to the first control unit via the internet-protocol-based network. The second control unit is designed to send or receive at least one control signal that can be transmitted via the vehicle data bus by the first control unit via the vehicle data bus.

14 Claims, 2 Drawing Sheets

(51) Int. Cl.
*H04W 92/02* (2009.01)
*H04L 12/66* (2006.01)

(52) U.S. Cl.
CPC ... *H04W 92/02* (2013.01); *H04L 2012/40215* (2013.01); *H04L 2012/40241* (2013.01); *H04L 2012/40273* (2013.01)

(56) References Cited

U.S. PATENT DOCUMENTS

| | | | |
|---|---|---|---|
| 2002/0123832 A1* | 9/2002 | Gotvall | H04L 43/12 701/36 |
| 2003/0147534 A1* | 8/2003 | Ablay | H04L 9/3252 380/270 |
| 2003/0223436 A1* | 12/2003 | Lohrmann | H04L 12/12 370/401 |
| 2006/0059276 A1* | 3/2006 | Muth | H04L 12/40013 710/15 |
| 2007/0286225 A1* | 12/2007 | Enders | H04L 12/40032 370/438 |
| 2008/0219274 A1* | 9/2008 | Kato | H04L 67/12 370/401 |
| 2008/0276107 A1* | 11/2008 | Bogavac | H04L 12/4135 713/323 |
| 2009/0041047 A1* | 2/2009 | Augustin | H04L 12/403 370/402 |
| 2009/0279645 A1* | 11/2009 | Berenger | H04L 69/323 375/340 |
| 2011/0022766 A1 | 1/2011 | Beckmann et al. | |
| 2012/0036297 A1 | 2/2012 | Choi | |
| 2012/0179730 A1 | 7/2012 | Slegers et al. | |
| 2012/0185876 A1 | 7/2012 | Abe et al. | |
| 2012/0307836 A1* | 12/2012 | Ishigooka | H04L 12/40006 370/401 |
| 2013/0238736 A1* | 9/2013 | Ando | H04L 41/0803 709/206 |
| 2013/0249281 A1 | 9/2013 | Petitpierre | |
| 2015/0071115 A1* | 3/2015 | Neff | H04L 43/50 370/254 |
| 2015/0089236 A1* | 3/2015 | Han | H04L 9/3242 713/181 |
| 2015/0106540 A1* | 4/2015 | Hoffmann | B60L 53/65 710/107 |
| 2015/0158440 A1 | 6/2015 | Maier | |
| 2016/0182341 A1* | 6/2016 | Fischer | H04L 12/66 370/251 |
| 2017/0053464 A1 | 2/2017 | Woerz et al. | |
| 2017/0230462 A1 | 8/2017 | Ascheid et al. | |

FOREIGN PATENT DOCUMENTS

| | | |
|---|---|---|
| CN | 101944043 A | 1/2011 |
| CN | 106114418 A | 11/2016 |
| DE | 102004020880 A1 | 11/2005 |
| DE | 102010004786 A1 | 7/2011 |
| DE | 102014208611 A1 | 11/2015 |
| DE | 102014113336 A1 | 3/2016 |

OTHER PUBLICATIONS

International Preliminary Report on Patentability directed to related International Patent directed to related International Patent Application No. PCT/EP2017/065552, dated Jan. 15, 2019, with attached English language translation; 16 pages.

* cited by examiner

DIRECT ACCESS TO BUS SIGNALS IN A MOTOR VEHICLE

TECHNICAL FIELD

The disclosure relates to a control system for at least one motor vehicle, including a first control unit and a second control unit. The first control unit has a data interface for coupling the first control unit to a vehicle data bus, as well as a first network interface for coupling the first control unit to the second control unit via an internet-protocol-based network. The second control unit has a second network interface for coupling the second control unit to the first control unit via the internet-protocol-based network. The second control unit is designed to send at least one control signal that can be transmitted via the vehicle data bus by means of the first control unit. The disclosure also relates to a method for operating a control system for at least one motor vehicle having such a first and second control unit. In the at least one motor vehicle, at least one control signal that can be transmitted via the vehicle data bus is sent or received via the vehicle data bus using the second control unit by means of the first control unit.

BACKGROUND

A number of electronic control units may be found in motor vehicles, wherein the control units may include a control device in the form of an embedded system, for example. The electronic control units are frequently connected or coupled to a vehicle data bus, such as, for example, the Controller Area Network (CAN) bus, Local Interconnect Network (LIN) bus, or the FlexRay bus. The control units coupled to the vehicle data bus may send and/or receive messages with one or a plurality of control signals as a data signal via the appropriate vehicle data bus. However, one or more additional control units that are not coupled to the specific vehicle data bus may also be present. Instead, another control unit may be connected, for example via an internet-protocol-based (IP) network, for example via Ethernet, to a control unit coupled to the vehicle data bus. If a control signal is now to be sent or received from the other control unit via the vehicle data bus, a special forwarding application program, a so-called routing application, must be present in the control unit coupled to the vehicle data bus. This routing application prepares control signals received from the other control unit via the IP network for transmission via the vehicle data bus.

All control signals that are to be sent and/or received in the future must already be known at the time the forwarding application program is developed, and must also already be adjusted to the corresponding vehicle data bus. Thus, the forwarding application program is very specialized with respect to each specific case and may not be re-used in other control units or control devices without adjustment, and, where necessary, re-compiling.

US 2012/0185876 A1 discloses a control device in which an inter-layer is used between an application program and a platform program in order to enhance efficiency in a development process.

DE 10 2010 004786 A1 describes a computer-aided method for providing a development environment to implement safety applications in a vehicle architecture. A plurality of safety modules, each having safety applications, are provided, wherein the safety applications of each safety module may be retrieved via one or a plurality of interfaces using external applications.

US 2012/0179730 A1 discloses a method and a device for a system for data storage in which a so-called mountpoint is allocated to an application layer in order to release files.

BRIEF DESCRIPTION OF THE DRAWINGS/FIGURES

FIG. 1 depicts a first control unit for a control system, according to one exemplary embodiment.
FIG. 2 depicts a control system for at least one motor vehicle, according to one exemplary embodiment.

DETAILED DESCRIPTION

The underlying object of the disclosure is to reduce the complexity of development for signal communication via vehicle data buses in at least one motor vehicle.

This object is attained using the subject matters of the claims. Some embodiments result from the claims, the description, and the figures.

The disclosure relates to a control system for at least one motor vehicle including a first control unit and a second control unit. The first control unit has a data interface for coupling the first control unit to a vehicle data bus, and a first network interface for coupling the first control unit to a second control unit via an internet-protocol-based (IP) network. Point-to-point connections in particular are made possible by the IP network. The second control unit has a second network interface for coupling the second control unit to the first control unit via the internet-protocol-based network. The second control unit is designed to send and/or receive at least one control signal that can be transmitted via the vehicle data bus, by means of, the first control unit via the vehicle data bus. The second control unit, due to its coupling to the first control unit, may thus access the vehicle data bus and may send and/or receive, for instance, a plurality of control signals via the at least one control signal.

The first control unit is designed to provide the at least one control signal that can be transmitted via the vehicle data bus as at least one device resource of an operating system kernel of the first control unit, the device resource being accessible independently from a bus protocol that is specific to the vehicle data bus. The second control unit is designed to provide the device resource of the first control unit to or for at least one application program in the second control unit via a network protocol of the internet-protocol-based network. The at least one control signal that can be transmitted using the first control unit via the vehicle data bus may thus be provided as a device resource for signal communication that is available in the IP network, for example via the network file system (NFS) of Sun Microsystems. The second control unit then provides the available device resource of the first control unit and may access the at least one device resource, completely transparently in terms of reading and writing, depending on specific read/write authorizations.

This has the advantage that one control unit, for example the second control unit, in a manner that is transparent and simple for the developer, can access communication signals that are available in another control unit the second control unit in another control system. In addition, a control unit, in this case the second control unit, without being directly physically coupled to a vehicle data bus, may transmit control signals via the vehicle data bus beyond the limits of the actual unit or the actual control device. That is, networking between control units may be realized. The networking may inter alia also be used to compensate susceptibility to errors, for instance when one interface to a vehicle data bus fails.

Since the device resource and thus the opportunity for sending and receiving the control signal via the vehicle data bus for the second control unit is provided via a network protocol, the second control unit can also flexibly be coupled to different first control units without corresponding application programs in the second control unit having to be adjusted to a changed first control unit. In addition, a corresponding application program can be moved from the second control unit to the first control unit or other control units in the IP network, since, in all control units of the IP network, the corresponding device resource may be made available with minimal complication as an interface independent of the bus protocol. Thus, for example, even depending on utilization of computing capacity of specific control units, an application program may be executed dynamically on specific different control units, for example in order to save power. It is not necessary to adjust the application program to the different control units due to the access by the second control unit to the device resource—wherein the access is standardized according to the network protocol—and thus to the corresponding application program on the vehicle data bus.

Thus, no adjustment to the specific different second control units or different application programs or applications is necessary in the first control unit, either. Furthermore, access protection against unauthorized reading and unauthorized writing, that is, unauthorized sending and receiving of control signals via the vehicle data bus, may also be realized in a simple manner using the rights management normally available in operating systems for device resources. Moreover, each user, that is both an application program and a developer, may see transparently in a file manager which control signals are available in the first control unit, also in the internet-protocol-based network and thus in the other second control unit, and thus may be transmitted via the vehicle data bus.

All of this drastically simplifies the development process for application programs and thus signal communication in the motor vehicle, since flexibility is enhanced for executing application programs in the control units and adapting control units and application program to individual communication structures is rendered at least largely unnecessary.

In some embodiments, the vehicle data bus includes a CAN data bus or a LIN data bus and or a FlexRay data bus. Simplified access to control signals that can be transmitted via the specific vehicle data bus is desirable especially for the data buses, which are widely used in the automotive field, and contributes greatly to simplifying the development of application programs.

In some embodiments, the at least one device resource, preferably all device resources, may be used or provided in the internet-protocol-based network via a network file system. The network file system may in particular be the Network File System (NFS) from Sun Microsystems or a comparable file system with rights management and in which the users can access files that are on a remote computer as if they were stored on their computer, or the network file system may include such a Network File System or a comparable file system.

This has the advantage that the control signals that can be transmitted may thus be accessed in a particularly simple manner, or that access is made possible for the second control unit in a particularly simple manner. The second control unit may thus send or receive control signals via the vehicle data bus without having any awareness that the corresponding control signals are being transmitted or can be transmitted via the vehicle data bus. This also simplifies the sending and receiving of control signals in a motor vehicle.

In some embodiments, the internet-protocol-based network includes a wireless network. The wireless network may in particular be a wireless local area network (WLAN). Alternatively or in addition, the internet-protocol-based network may also include a local area network (LAN). In particular a wireless network provides especially good flexibility. Thus, on the one hand, the second control unit may send or receive a control signal, independently of a physical location or coupling, by means of the first control unit via the vehicle data bus. On the other hand, with particular flexibility, there may also be alternative access via another first control unit or another second control unit. This is advantageous in particular when an application program may potentially be used in different second control units, in order to ensure access to a prespecified vehicle data bus.

Moreover, access via a wireless network also enables access to the vehicle data bus or sending/receiving of control signals via the vehicle data bus using the second control unit when the second control unit is disposed outside of the motor vehicle of the first control unit. This may be favorable for diagnostic purposes, for example. A wireless local area network is particularly advantageous in that the range exceeds the range of other wireless technologies, such as, for example, Bluetooth. Thus, an exchange of control signals that spans motor vehicles or an access to the vehicle data bus that spans motor vehicles is enabled. It may occur, for example, in an actual driving situation.

In some embodiments, the first control unit is part of a first motor vehicle and the second control unit is part of a second motor vehicle. In this way the second motor vehicle may access control signals that are available via the vehicle data bus of the first motor vehicle. Thus, for example, if the second motor vehicle is driving behind the first motor vehicle, the second control unit may receive speed and/or acceleration values as control signals from the first control unit and thus initiate braking and/or acceleration maneuvers of the second motor vehicle early. Other maneuvers by the leading first motor vehicle, for instance driving maneuvers that may be retrieved from the vehicle data bus or control signals that may be derived therefrom, may thus be detected early by the second control unit in the second motor vehicle and therefore taken into consideration in the second motor vehicle. For example, turning maneuvers or direction-changing maneuvers may be taken into consideration here.

In some embodiments, the control signal that can be transmitted includes or represents vehicle data from the first motor vehicle. In particular, the control signal may include or represent acceleration data from the first motor vehicle, in particular a longitudinal and/or transverse acceleration, and/or speed data from the first motor vehicle and/or route data from a navigation system of the first motor vehicle. In this way the signal communication between the vehicles is enhanced in a particularly simple and elegant manner, since the second motor vehicle obtains information via the first motor vehicle practically without any signal path-induced temporal delay or sensor inaccuracy.

In some embodiments, the second control unit is designed merely to receive the control signal that can be transmitted. Thus, it may be ensured that the second control unit of the second motor vehicle does not improperly transmit control signals via the vehicle data bus of the first motor vehicle. In this case this may be realized in a particularly simple manner using the rights management present in the operating system kernel.

In some embodiments, the device resource may be a device or a virtual device, a so-called "device" that may be logically connected to, that is "suspended," "provided," or "mounted" on the device tree of the operating system kernel. The device resource also includes a file. The virtual device may be suspended or mounted on a device tree of the operating system kernel. In particular, the file may include a system file for loading and rendering available at least one standard device driver and for loading a file system driver and for providing data carrier access. Thus, the system file may be a system file according to the known io.sys known from MS-DOS. In particular, receiving or sending of the control signal may be implemented as reading or writing the file. This has the advantage that the advantages are particularly simple to realize, since it is standard in operating systems that they may already be used for virtual devices or files. Thus, for example, rights management or a portion of the device resources may be implemented in a particularly simple manner via a network protocol without complex individual adjustment of the application program to the control unit or the corresponding operating system being necessary.

In some embodiments, the at least one provided device resource can be rendered accessible or inaccessible for at least one application program in the second control unit via appropriate commands or control commands to the operating system kernel of the first control unit. Thus, for example, the provided device resource may be rendered accessible for an application program with the POSIX compliant command "open( )" or a command having a similar effect, and/or may be rendered inaccessible with the POSIX compliant command "close( )" or a command having a similar effect. Via or with appropriate other commands or control commands to the operating system kernel, a control signal that can be transmitted and that is to be sent can be sent via the vehicle data bus, and/or a control signal that can be sent and that is to be received may be received via the vehicle data bus. Thus a control system may be sent for example with the POSIX compliant command "write( )" or a command having a similar effect on the device resource via the data bus, and/or the control signal may be received with the POSIX compliant command "read( )" or a command having a similar effect on the device resource via the vehicle data bus. This has the advantage that the specific control signals may be sent and/or received in a known manner and in a particularly simple and intuitive fashion, regardless of the type of vehicle data bus or a specific bus protocol. Because the provided device resource may be rendered accessible and inaccessible individually for a specific application program and thus also for a specific second control unit, a high degree of security is also attained in a simple manner and malfunctions and incorrect accesses are prevented.

The disclosure also relates to a motor vehicle having a first and/or a second control unit that is part of a control system according to one of the embodiments.

The disclosure also relates to a method for operating a control system for at least one motor vehicle, the control system including two control units. The first control unit has a data interface for coupling the first control unit to a vehicle data bus, as well as a first network interface for coupling the first control unit to the second control unit via an internet-protocol-based network. The second control unit has a second network interface for coupling the second control unit to the first control unit via the internet-protocol-based network.

One step of the method here is sending or receiving at least one control signal that can be transmitted via the vehicle data bus by means of the first control unit via the vehicle data bus using the second control unit. Another step is providing, using the first control unit, the at least one control signal that can be transmitted via the vehicle data bus as at least one device resource of an operating system kernel of the first control unit, the device resource being accessible independently from a bus protocol that is specific to the vehicle data bus. Another step is providing, using the second control unit, the device resource of the first control unit via a network protocol of the internet-protocol-based network to at least one application program in the second control unit. Sending or receiving the control signal that can be transmitted includes the application program of the second control unit accessing the device resource of the first control unit via the network protocol.

Some embodiments of the method here correspond to some embodiments of the control system.

The features and combinations of features cited in the description in the foregoing, as well as the features cited or illustrated alone or in combinations of features in the following in the description of the figures, may be used not only in the combination indicated, but also in other combinations, without departing from the context of the disclosure. Thus, embodiments of the disclosure that are not explicitly illustrated and explained in the figures, but that proceed from and may be produced using separate combinations of features, shall be considered to be included and disclosed. Embodiments and combinations of features that thus do not have all features of an originally formulated claims shall also be considered to be disclosed. Moreover, embodiments and combinations of features that go beyond or deviate from the combinations of features illustrated in the references in the claims, in particular using the embodiments explained above, are to be considered disclosed.

Exemplary embodiments of the disclosure shall be explained in greater detail in the following using schematic drawings.

Identical or functionally equivalent elements are provided the same references in the figures.

Figure 1:
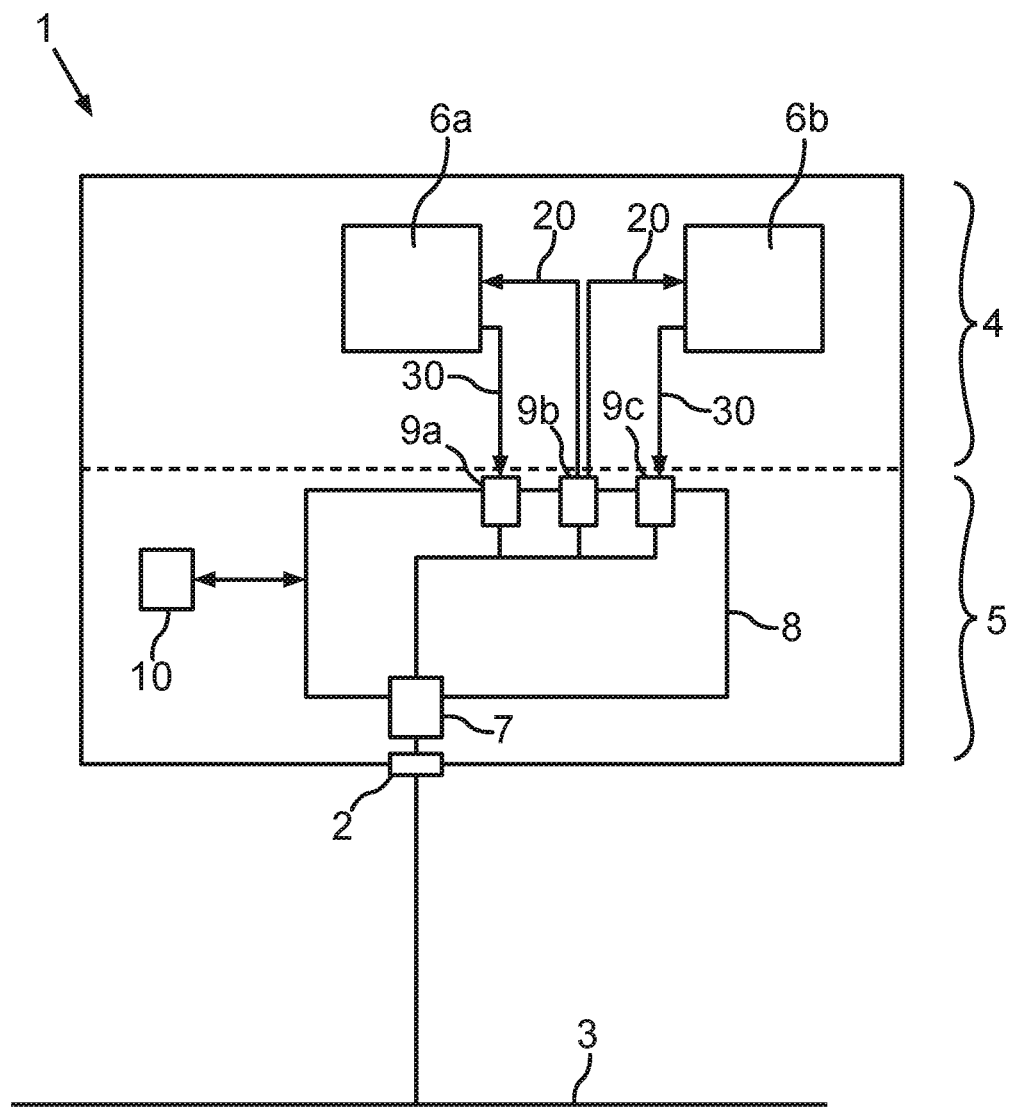
FIG. 1 depicts one exemplary embodiment of a first control unit for a control system.
Figure 2:
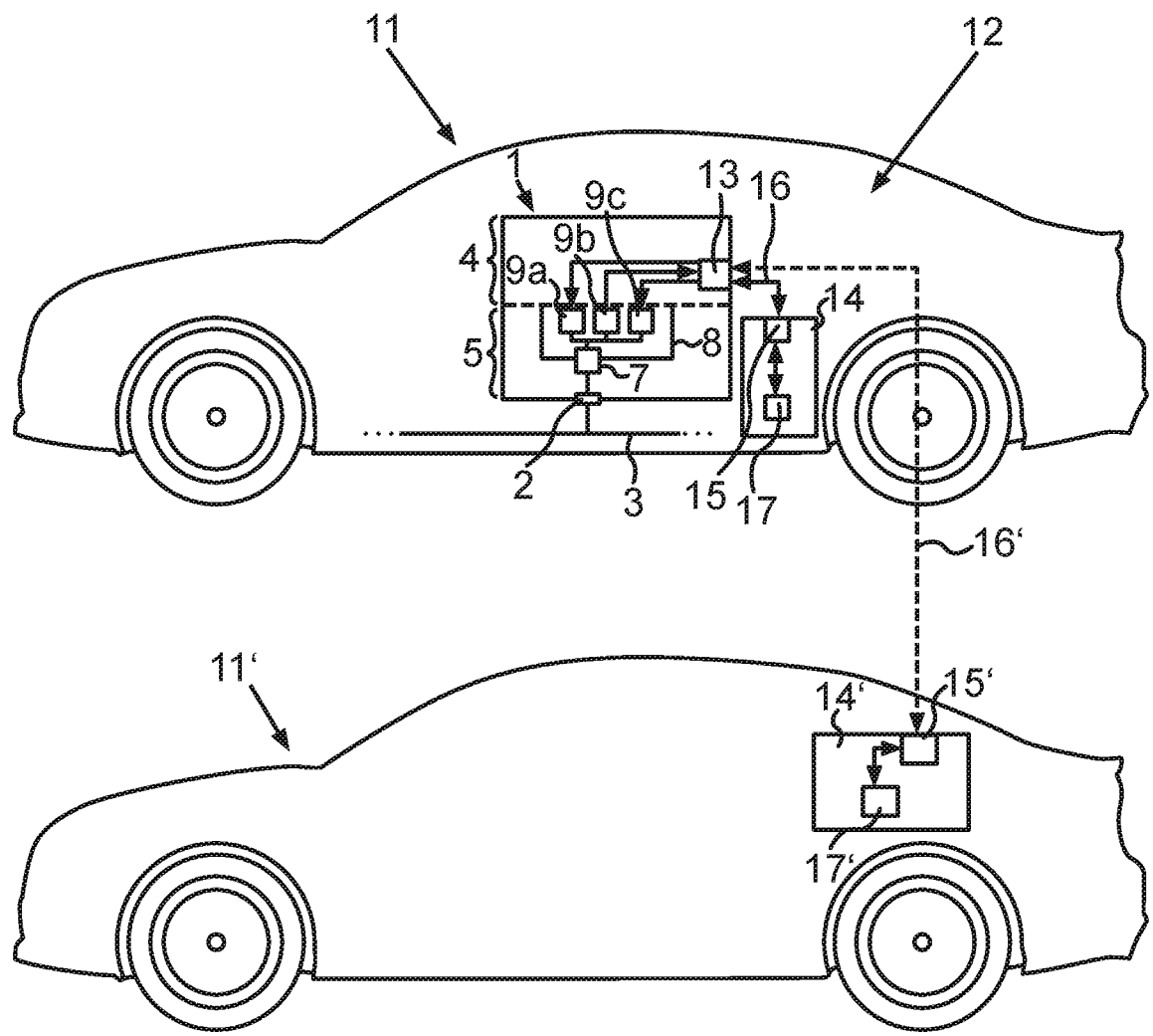
FIG. 2 depicts a control system for at least one motor vehicle according to one exemplary embodiment.

FIG. 1 depicts an exemplary embodiment of a first control unit 1 for a motor vehicle. To improve understanding of the manner in which the first control unit 1 functions, depictions of components that are only relevant with respect to a second control unit 14, 14' (FIG. 2) are omitted, especially depictions of a first network interface 13 (FIG. 2) and an internet-protocol-based network 16, 16' (FIG. 2). The interaction between the first control unit 1 and the at least one second control unit 14, 14' (FIG. 2) proceeds from FIG. 2.

In this case, the first control unit 1 has a data interface 2 for coupling the first control unit 1 to a vehicle data bus 3. The first control unit 1 furthermore has an application layer 4 and an operating system layer 5 in this example. At least one application program 6a, 6b, in this case a first application program 6a and a second application program 6b, is present in the application layer 4 here. A control signal that can be transmitted via the vehicle data bus 3 may be produced or evaluated using the two application programs 6a, 6b. When the first control unit 1 is coupled to the second control unit 14, 14' (FIG. 2) via the internet-protocol-based network 16, 16' (FIG. 2) corresponding to the introduced interaction principle, the two application programs 6a, 6b may also be present in the second control unit 14, 14' (FIG. 2) and be executed or be able to be executed.

A communication end point 7 or socket of the vehicle data bus 3 is provided in the operating system layer 5 of the first control unit 1 here using an operating system kernel. The communication end point 7 may also be provided using an operating system kernel expansion in an alternative embodiment. The communication end point 7 here is embodied for transmitting, via the vehicle data bus 3, the control signal that can be transmitted according to a bus protocol that is specific to the vehicle data bus 3. In the example depicted, present in the operating system layer 5 is an interface layer 8 that provides the control signal that can be transmitted as a device resource 9a, 9b, 9c accessible independently from the bus protocol that is specific to the vehicle data bus 3, in this case a first device resource 9a, a second device recourse 9b, and a third device resource 9c of the operating system kernel. For example, the first device resource 9a represents a speed, the second device resource 9b represents an ignition, and the third device resource 9c represents a temperature.

In the example depicted, the interface layer 8 is configurable using a configuration file 10 stored or provided in the first control unit 1, which configuration file in the example depicted allocates a device resource 9a, 9b, 9c to each control signal that can be transmitted. In this case the first control unit 1 is designed, when the control unit 1 is restarted, to read in the configuration file 10 and to configure itself and to make available, that is, to provide, the device resource 9a, 9b, 9c corresponding to the at least one control signal that can be transmitted. In this case it may be taken from the configuration file 10 which device resource 9a, 9b, 9c is to be applied from the interface layer 8 and in which data signal, for example in which bus message, the specific control signal is contained at which position.

In the present exemplary embodiment, the at least one provided device resource 9a, 9b, 9c may be rendered accessible and inaccessible for the at least one application program, in this case the two application programs 6a, 6b, via corresponding (control) commands to the operating system kernel using the interface layer 8. This may occur, for example, using a control command oriented to the specific device resource 9a, 9b, 9c such as "open( )" and "close( )". Moreover, a control signal that can be transmitted and that is to be sent may be sent and/or a control signal that can be transmitted and that is to be received may be received via appropriate additional commands to the operating system kernel. This may occur, for example, using a first control command "read( )" 20 and/or second control command "write( )" 30 directed to the specific device resource 9a, 9b, 9c.

Now, if for example the device resources 9a, 9b, 9c are provided as the device, that is, the so-called "device" in the "device tree" of the operating system, in this case the control signals allocated to the specific device resources 9a, 9b, 9c may be accessed via the device tree. Thus, for example, in this case the first device resource 9a may be provided under/dev/sendsignal/speed in the device tree, the second device resource 9b may be provided under/dev/receivesignal/ignition, and the third device resource 9c may be provided under dev/sendsignal/temperature. In this case, the first application program 6a may, for example, execute the first control command "read( )" 20 to the second device resource 9b and then obtains the current status of the ignition. The same also applies for the second application program 6b in the depicted example. In the depicted example, the first application program 6a may execute the second control command "write( )" 30 on the first device resource 9a in order to change the corresponding value of the control signal, in this case the speed. Correspondingly, in the depicted example the second application program 6b can execute the second control command "write( )" 30 on the third device resource 9c and there set a value for the temperature. Since in this case the device resources are provided as virtual devices in the device tree of the operating system, the standard rights management for protecting control signals from unauthorized reading and writing may be used here. Thus it is possible, for example, to prevent the second application program 6b from erroneously applying the second control command "write( )" 30 to the first device resource 9a as the result of an error.

If a data signal is now provided on the vehicle data bus 3 and thus also on the communication end point 7, this data signal, which includes for example the control signal that can be transmitted, which in this case represents a current status of the ignition, is stored in the interface layer 8 as a property of the associated device resource 9a, 9b, 9c, that is, in this case, of the second device resource 9b. Thus the control signal contained in the transmitted data signal may be stored in the control unit 1 and thus made available to the application programs 6a, 6b continuously and always up-to-date. If the vehicle data bus 3 is an event-based vehicle data bus 3, the appropriate control signal (or the data signal allocated according to the bus protocol) may also only be requested upon a control command, such as the first control command "read( )" 20 via the vehicle data bus 3.

Conversely, that is, if the control signal to be transmitted is a control signal to be sent by one of the application programs 6a, 6b, a corresponding variable, for example a measured value of a sensor connected to the control unit 1 or a variable derived from the measured value using the appropriate application program 6a, 6b, may be provided and used as a property of the specific device resource 9a, 9b, 9c via an appropriate command, in this case the second control command "write( )" 30. The corresponding property of the device resource 9a, 9b, 9c may then also be used, for example, by another application program and/or another control unit, for example the second control unit 14, 14' (FIG. 2). In this case the first application program 6a may set a value for the speed as a property of the first device resource 9a via the second control command "write( )" 30. The second application program 6b may then in this case store a value for a temperature in the third device resource 9c via the appropriate second control command "write( )" 30. As stated in the foregoing and explained below, the application programs 6a, 6b may also be present outside of the first control unit 1, for instance in the additional control unit 14, 14' (FIG. 2). These values may then be converted using the interface layer 8 into a data signal that may be transmitted via the vehicle data bus 3 according to the bus protocol.

If, for example, the value for the speed and the value for the temperature are now to be transmitted in a single common data signal according to the bus protocol specific to the data bus 3, the interface layer 8 joins, by means of the appropriate control command, here the second control command "write( )" 30, the values stored by the two application programs 6a, 6b for speed and temperature in this case according to the requirements of the bus protocol. Thus, as a consequence, the control signals that are sent by the different application programs 6a, 6b are provided together via the communication end point 7 in the vehicle data bus 3 and transmitted thereby.

Thus, for example, if the first control unit 1 or the application programs 6a, 6b in another motor vehicle having other communication relationships, that is, for example, having another bus identification number for the first control unit 1 on the vehicle data bus 3, these application programs 6a, 6b are not recompiled, but rather may continue to be used with nothing further. Only the configuration file 10 must be updated in this case. Thus, when the principle explained is applied properly, the application programs 6a, 6b may also be used, with nothing further, in additional first control units 1 having the properties cited above. Thus great flexibility is attained in a simple manner in terms of the application programs 6a, 6b that may be executed on the hardware of the specific first control units 1.

FIG. 2 depicts an exemplary embodiment of a control system 12 for at least one motor vehicle. The control system 12 includes the first control unit 1, which is essentially the same as the first control unit 1 illustrated in FIG. 1. The two application programs 6a, 6b that may also be, but do not have to be, present in the first control unit 1 illustrated in FIG. 2 are not used in this case. Instead, in the example depicted, the first network interface 13 of the first control unit 1 for coupling the first control unit 1 to at least one second control unit 14, 14' is now depicted.

The illustrated control system 12 in this case has a second control unit 14 with a second network interface 15 for coupling the second control unit 14 to the first control unit 1 via an internet-protocol-based network 16. The second control unit 14 in this case is arranged, like the first control unit 1, in a first motor vehicle 11 and in the example illustrated is coupled via a local area network 16, for example via Ethernet, to the first control unit 1.

In the exemplary embodiment, the control system 12 depicted here also has an additional second control unit 14' with an additional second network interface 15' for coupling the additional second control unit 14' to the first control unit 1 via an internet-protocol-based network 16'. In this case the additional second control network 14' is coupled to the first control unit 1 via a wireless network 16', for example a local wireless network in the form of a WLAN. The additional second control network 14' is arranged in a second motor vehicle 11'.

Since in this case at least one control signal that can be transmitted via the vehicle data bus 3—as in the illustrated example in FIG. 1 three control signals can be transmitted—is provided as a device resource 9a, 9b, 9c of an operating system kernel of the first control unit and accessible independently from a bus protocol specific to the vehicle data bus 3, now in the second control units 14, 14', each desired device resource 9a, 9b, 9c of the first control unit 1 can be provided via a network protocol of the internet-protocol-based network 16, 16' and thus on any application program 17, 17'. The specific application program 17, 17', in this case the first application program 17 in the one second control unit 14 and the second application program 17' in the additional second control unit 14', corresponds here to the application program 6a, 6b (FIG. 1), exists only physically outside of the first control unit 1. This is possible without forfeiting function, since the device resource 9a, 9b, 9c of the first control unit 1 may be provided in the network 16, 16' via a network file system such as the Network File System by Sun Microsystems.

Thus, for the specific application program 17, 17' in the second control unit 14, 14' the specific device resource 9a, 9b, 9c may be treated like a device resource present locally in the second control unit 14, 14'. Thus, just like the application programs 6a, 6b (FIG. 1) in the first control unit 1, the application program 17, 17' in the second control unit 14, 14' does not have to be adjusted to bus-specific protocols or other properties of the vehicle bus 3. Therefore, great flexibility is attained because for example the first application program 17 may be executed and located in the first control unit 1, given sufficient computer power, even without adjusting the first application program 17 and/or the first control unit 1.

The first application program 17 in the second control unit 14, for example in another network structure of a different vehicle model, may also be coupled to the or to an additional vehicle data bus 3 via an additional first control unit 1 without having to be adjusted to the other first control unit and/or to the specific type or property of the vehicle data bus 3.

In the example depicted, the additional second control unit 14' of the second motor vehicle 11' is now also coupled to the first control unit 1 via the internet-protocol-based network 16'. In this way the second application program 17' in the additional second control unit 14' can also access control signals that can be transmitted and that are from the vehicle data bus 3 of the first motor vehicle 11 via the additional second network interface 15'. Thus, for example, the second motor vehicle 11' or the additional second control unit 14' of the second motor vehicle 11' can query, early on, braking and/or acceleration maneuvers via the vehicle data bus 3 of the first motor vehicle 11 as a control signal and react accordingly. Complex detection steps that are based on detection algorithms for a behavior of, for example, the leading first motor vehicle 11 are not necessary, so that the described functionality is realized with particularly low complexity.

The invention claimed is:

1. A control system for a motor vehicle, comprising a first and a second control unit, wherein the first control unit comprises:
   a data interface for coupling the first control unit to a vehicle data bus; and
   a first network interface for coupling the first control unit to the second control unit via an internet-protocol-based network,
   wherein the first control unit is configured to provide a control signal that is transmitted via the vehicle data bus as a device resource of an operating system kernel of the first control unit, the device resource being accessible independently from a bus protocol that is specific to the vehicle data bus; and
   the second control unit comprises:
   a second network interface for coupling the second control unit to the first control unit via the internet-protocol-based network,
   wherein the second control unit is configured to send or receive the control signal that is transmitted via the vehicle data bus by the first control unit via the vehicle data bus, and to provide the device resource to an application program in the second control unit via a network protocol of the internet-protocol-based network.

2. The control system of claim 1, wherein the vehicle data bus comprises a Controller Area Network (CAN) data bus, a Local Interconnect Network (LIN) data bus, or a FlexRay data bus.

3. The control system of claim 1, wherein the device resource is provided in the internet-protocol-based network via a network file system.

4. The control system of claim 1, wherein the internet-protocol-based network comprises a wireless network.

5. The control system of claim 4, wherein the wireless network is a wireless local network.

6. The control system of claim 1, wherein the first control unit is part of a first motor vehicle and the second control unit is part of a second motor vehicle.

7. The control system of claim 1, wherein the second control unit is designed only to receive the control signal that is transmitted.

8. The control system of claim 1, wherein the control signal comprises vehicle data of the first motor vehicle.

9. The control system of claim 8, wherein the vehicle data are acceleration data, speed data, or route data of a navigation system of the first motor vehicle.

10. The control system of claim 1, wherein the device resource comprises a virtual device or a file.

11. The control system of claim 10, wherein the file is a system file for loading and rendering an available standard device driver, for loading a data system driver or for providing data carrier access.

12. The control system of claim 1, wherein the device resource is rendered accessible or inaccessible for the application program in the second control unit via appropriate commands to the operating system kernel of the first control unit.

13. The control system of claim 1, wherein the control signal is sent or received via the vehicle data bus and appropriate additional commands to the operating system kernel.

14. A method for operating a control system for a motor vehicle, comprising:
- coupling, by a data interface, a first control unit to a vehicle data bus;
- coupling, by a first network interface, the first control unit to a second control unit via an internet-protocol-based network;
- coupling, by a second network interface, the second control unit to the first control unit via the internet-protocol-based network;
- sending or receiving, by the first control unit, a control signal via the vehicle data bus using the second control unit, wherein the sending or receiving of the control signal comprises accessing a device resource of the first control unit via a network protocol by an application program of the second control unit;
- providing, using the first control unit, the control signal that is transmitted via the vehicle data bus as the device resource of an operating system kernel of the first control unit, the device resource of the operating system kernel of the first control unit being accessible independently from a bus protocol that is specific to the vehicle data bus; and
- providing, using the second control unit, the device resource of the first control unit via the network protocol of the internet-protocol-based network to the application program in the second control unit.

* * * * *